United States Patent [19]
Friedrich et al.

[11] Patent Number: 5,758,694
[45] Date of Patent: Jun. 2, 1998

[54] FIRE RESISTANT PIPE

[75] Inventors: Ralph S. Friedrich, Hermosa Beach, Calif.; John F. Kane, Clearwater Beach, Fla.; Mark H. Fortune, El Segundo, Calif.

[73] Assignee: Ameron International Corporation, Pasadena, Calif.

[21] Appl. No.: 643,621

[22] Filed: May 6, 1996

Related U.S. Application Data

[63] Continuation-in-part of Ser. No. 548,226, Oct. 25, 1995.

[51] Int. Cl.$^6$ ........................................ F16L 9/14
[52] U.S. Cl. ............... 138/144; 138/129; 138/177; 138/DIG. 1; 138/DIG. 7; 428/36.2; 428/36.7
[58] Field of Search ...................... 138/144, 129, 138/137, 140, 177, 172, DIG. 1, DIG. 7; 428/36.2, 36.4, 36.9, 34.7

[56] References Cited

U.S. PATENT DOCUMENTS

| | | | |
|---|---|---|---|
| 3,652,375 | 3/1972 | Johnson | 161/158 |
| 3,706,615 | 12/1972 | Nishiyama et al. | 156/169 |
| 3,874,972 | 4/1975 | Wesgh | 156/169 |
| 4,053,447 | 10/1977 | Shea | 260/38 |
| 4,076,873 | 2/1978 | Shea | 428/35 |
| 4,080,999 | 3/1978 | Bulters et al. | 138/125 |
| 4,081,302 | 3/1978 | Drostholm et al. | 156/190 |
| 4,104,095 | 8/1978 | Shaw | 156/83 |
| 4,107,127 | 8/1978 | Shea | 260/38 |
| 4,192,697 | 3/1980 | Parker et al. | 156/188 |
| 4,645,553 | 2/1987 | Languillat | 156/153 |
| 5,084,314 | 1/1992 | Igarashi et al. | 428/36.2 |
| 5,091,230 | 2/1992 | Fuchs et al. | 428/36.4 |
| 5,364,908 | 11/1994 | Oishi et al. | 525/64 |
| 5,383,994 | 1/1995 | Shea | 156/175 |
| 5,585,155 | 12/1996 | Heikkila et al. | 428/36.7 |

*Primary Examiner*—Patrick F. Brinson
*Attorney, Agent, or Firm*—Christie, Parker & Hale, LLP

[57] ABSTRACT

Fire resistant pipes and pipe fittings include a structural pipe wall formed from helically wound reinforcing fiber that is bonded together with a thermoset polymer resin selected from the group consisting of phenolic resins, siloxane-modified phenolic resins, furan resins, and mixtures thereof. A jacket is disposed around the structural pipe wall and comprises alternating release layers and fiber-reinforced resin layers. The release layer is formed from a material that is incompatible with the resin of the structural pipe wall and fiber-reinforced resin layers, and is energy absorbing to improve impact resistance and reduce thermal stress. The jacket is formed having a sufficient number of alternating layers, having sufficient layer thicknesses, to protect the structural pipe wall from heat induced failure produced by exposing the outermost pipe wall to a 1,000° C. flame for at least five minutes in a dry condition.

19 Claims, 2 Drawing Sheets

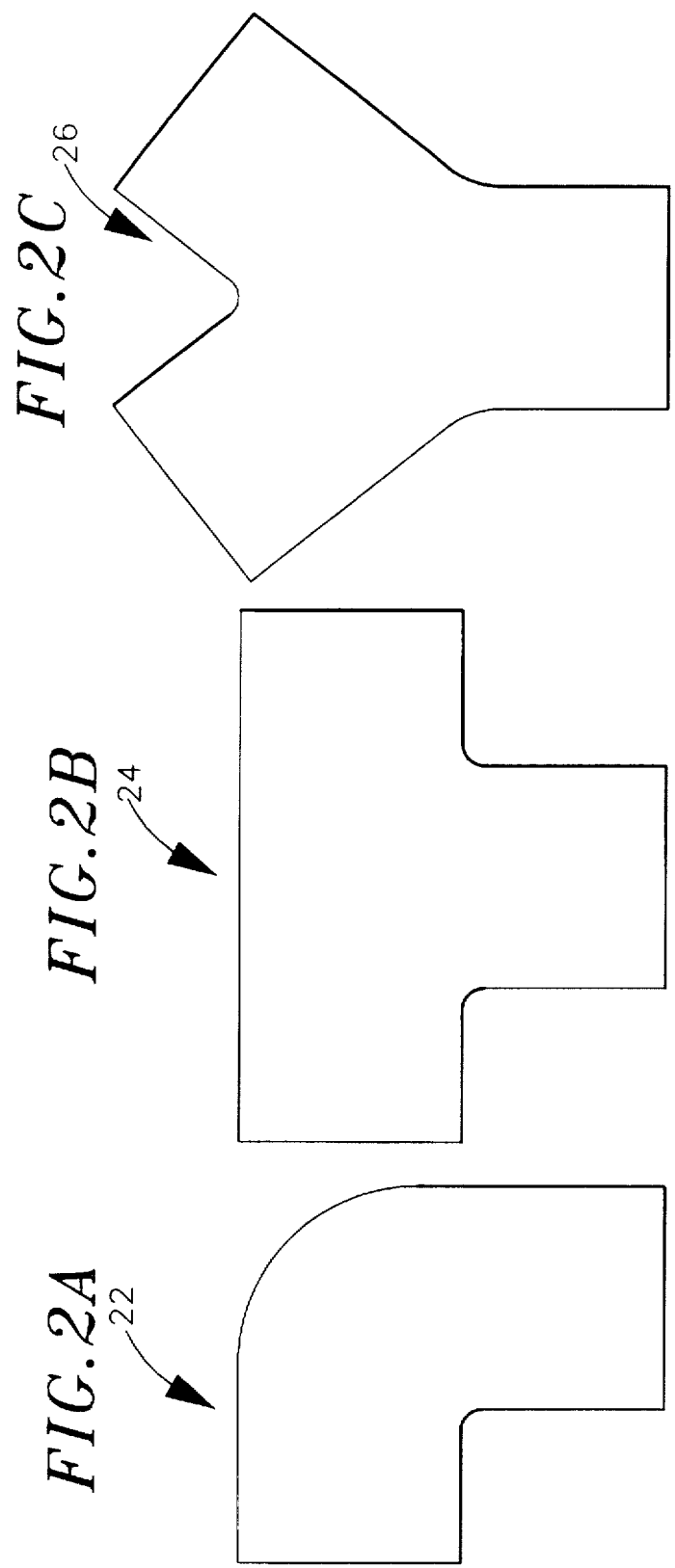

FIRE RESISTANT PIPE

RELATIONSHIP TO COPENDING PATENT APPLICATIONS

This patent application is a continuation-in-part of copending U.S. patent application Ser. No. 08/548,226, filed on Oct. 25, 1995.

FIELD OF THE INVENTION

The present invention relates generally to fire resistant pipe and pipe fittings and, more particularly, to a filament wound fiber-reinforced pipe and pipe fittings having one or more surrounding fiber-reinforced resin impregnated layers, which display enhanced fire resistance, burst strength, and impact resistance when compared with conventional fiber-reinforced pipes and pipe fittings.

BACKGROUND OF THE INVENTION

Pipes and pipe fittings formed from fiber-reinforced plastics have gained widespread acceptance as viable alternatives to their steel counterparts in such applications where cost, weight, and/or chemical resistance is a concern. Conventional fiber-reinforced plastic pipes include a filament component that is wound on a mandrel, and a resin component that is used to bond the filament windings together. The filament winding acts to structurally reinforce the otherwise resin pipe by providing a desired degree of hoop and longitudinal strength to the pipe. The fiber and resin components are selected for one or more desired physical properties, making the pipe particularly adapted to a specific application. Polyester and epoxy resins are typically favored for use in forming such pipes and pipe fittings because of their good weatherability, corrosion, and chemical resistance.

Fiber-reinforced plastic pipes and pipe fittings are used in applications where some degree of temperature resistance is desired as well as weather, corrosion and chemical resistance. An example of one such application is fire fighting piping that is used in industrial plants, offshore platforms and the like. Typically, pipes and pipe fittings used in fire fighting piping must be designed to accommodate and deliver a desired pressure of water, or other fire fighting liquid, foam, or foam/liquid mixture, when subjected to high temperature conditions or when placed in close flame vicinity. Fiber-reinforced plastic pipes are favored for use as fire fighting piping on off-shore oil platforms and are typically maintained in an empty or uncharged state until a fire is detected. Once a fire is detected, water is routed to the pipes at pressures that can be as high as 225 psig (16 Kgf/cm²), depending on the rated pressure for the pipe. Accordingly, fiber-reinforced pipes that are used in such applications must be able to withstand an elevated temperature and/or close flame contact for a brief period of time when empty, i.e., without the benefit of being charged with water and having the water act as a heat transfer medium to minimize detrimental temperature effects.

Fiber-reinforced plastic pipes used in such fire fighting pipe applications include those made from epoxy resin because of their enhanced corrosion resistance. A rigorous test has been devised to qualify fiber-reinforced pipes for use in such fire fighting pipe applications. The test requires placing the pipe and pipe fitting assembly in close vicinity to a 1,000° C. flame with the pipe dry for a period of five minutes, and then filling the pipe with water at a rated pressure for a fixed amount of time, e.g., approximately fifteen minutes. To pass the test, the pipe and pipe fittings assembly must not show any signs of structural damage and only minor leakage. Fiber-reinforced plastic pipes and pipe fittings formed from epoxy resin have been shown to display significant temperature induced deterioration at temperatures as low as 120° C. and, therefore, have proven incapable of passing the test. Fiber-reinforced pipes and pipe fittings formed from polyester resin are equally incapable of passing the test, as these pipes have been demonstrated significant temperature induced deterioration at temperatures as low as 94° C.

In order to pass the test, fiber-reinforced plastic pipes formed from epoxy resin can be coated with an intumescent coating, or formed from an intumescent containing epoxy resin. When exposed to high-temperature conditions or flame contact, the intumescent coating foams, forming a temperature insulating barrier that serves to protect the underlying pipe surface. However, a disadvantage of using an intumescent coating is that it increases the expense of the fiber-reinforced plastic pipe, thereby reducing the cost incentive for using the pipe, and generates toxic smoke when subjected to flame contact.

An alternative for using intumescent coated fiber-reinforced epoxy pipes in fire fighting pipe applications is to construct the pipe from phenolic rather than epoxy resin, which is known to provide enhanced temperature resistance. However, fire fighting pipes and pipe fittings made from fiber-reinforced phenolic resin have also been found to be incapable of passing the test, displaying fiber rupture induced side wall failures when exposed to rated pressures.

Fiber-reinforced plastic pipes formed from epoxy, polyester and phenolic resins are known to display a limited amount of impact resistance and flexibility. Physical properties of impact resistance and flexibility are desired in applications such as fire fighting piping and pipe fittings because it is desired that such piping remain capable of retaining a rated water pressure even when subjected to some amount of movement, possibly created by falling, failing or distorting adjacent structures during a fire.

It is, therefore, desired that fiber-reinforced resin pipe and pipe fittings be constructed that are lightweight, weatherable, corrosion resistant, chemical resistant, and have sufficient burst strength and temperature resistance to pass the above-described test for use in fire fighting pipe applications. It is desired that the fiber-reinforced resin pipe not produce toxic smoke when exposed to flame contact, and provide a desired degree of both impact resistance and flexibility. It is also desired that the fiber-reinforced resin pipe be formed from available materials using conventional manufacturing techniques.

SUMMARY OF THE INVENTION

There is, therefore, provided in the practice of this invention fire resistant pipes and pipe fittings that are constructed having sufficient temperature and flame contact resistant to permit their use in such high-temperature applications as fire fighting piping. Fire resistant pipes prepared according to principles of this invention include a structural pipe wall formed from helically wound reinforcing fiber that is bonded together with a thermoset polymer resin. The polymer resin is selected from the group consisting of phenolic resins, siloxane-modified phenolic resins, furan resins, and mixtures thereof. The helically wound reinforcing fiber is wetted by the resin so that it comprises in the range of from about 10 to 40 percent by weight resin. The structural wall is formed from multiple layers of the windings, wherein the number of layers depend on such factors as the desired hoop and longitudinal strength, and temperature resistance desired for a particular pipe application.

A jacket comprising alternating layers of release material and fiber-reinforced resin are disposed around the structural pipe wall. The release material is chemically incompatible with the resin used to form both the structural pipe wall and fiber-reinforcing layers to function as a disbandment layer to attenuate shock waves that may travel through the pipe from outside impact, thereby enhancing the impact resistance of the pipe. The release material is also an energy absorbing material that is capable of absorbing heat energy from an outside surrounding layer by phase transformation, e.g., to produce a gas, below a degradation temperature of the structural wall. The gas formed by such phase transformation produces a thermally insulating air pocket therebetween that acts to reduce thermal stress within the pipe. The fiber-reinforced resin layers can be made from the same or different fiber and resin components used to form the structural wall.

The jacket is formed from a sufficient number of repeating layers, having sufficient layer thicknesses, to protect the structural wall from heat induced failure produced by exposing the outermost pipe wall to a 1,000° C. flame for at least five minutes in a dry condition, i.e., when the pipe is not charged with water. Fire resistant pipes and pipe fittings prepared according to principles of this invention are lightweight, weatherable, corrosion resistant, chemical resistant, and have sufficient temperature resistance to be used in fire fighting pipe applications without suffering temperature or flame contact related failure. Fire resistant pipes of this invention, when exposed to flame contact, do not produce toxic smoke and have enhanced impact resistance and flexibility when compared to conventional fiber reinforced plastic pipes formed from epoxy and polyester resin ingredients.

BRIEF DESCRIPTION OF THE DRAWINGS

These and other features and advantages of the present invention will become appreciated as the same becomes better understood with reference to the specification, claims, and drawings wherein:

FIGS. 2A to 2C are elevational side views of fire resistant pipe fittings constructed according to principles of this invention.

DETAILED DESCRIPTION

Figure 1:
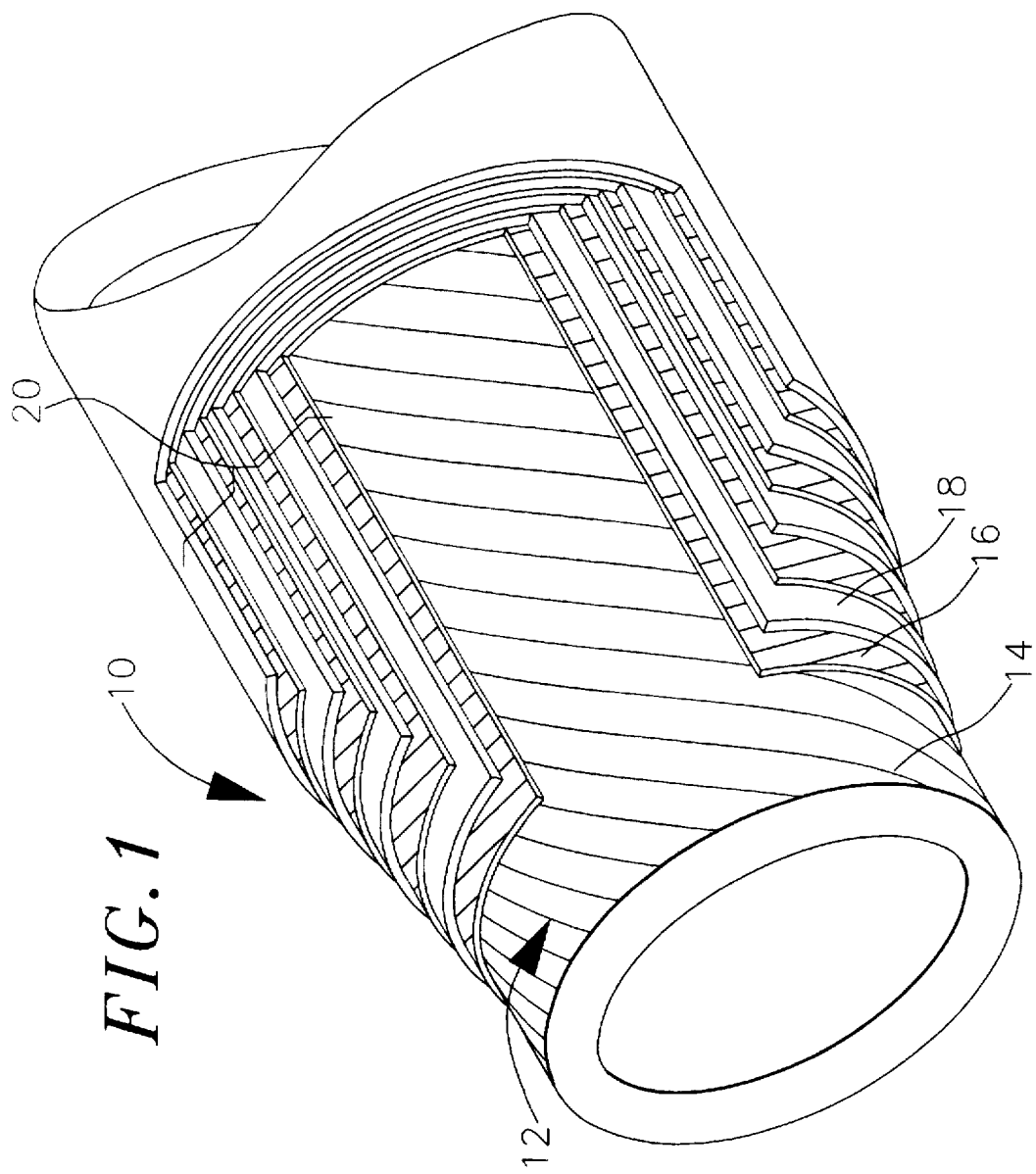
FIG. 1 is a perspective view of an exemplary embodiment of a fire resistant pipe, constructed according to principles of this invention, comprising a jacket of repeating release layers and fiber-reinforced resin layers interposed between a structural pipe wall and an outside fiber-reinforced resin layer.

Referring to FIG. 1, a fire resistant pipe 10 constructed according to principles of this invention includes a structural pipe wall 12 formed from multiple layers of helically wound reinforcing fiber 14 bonded together with a resin. The structural pipe wall 12 can be formed by using conventional techniques well known in the art for forming fiber-reinforced plastic (FRP) pipe, such as by winding the reinforcing fiber around a mandrel at one or more specific wind angles, and in one or more directions, to obtain a particular degree of hoop and longitudinal strength. In a preferred embodiment, the fiber windings are wound under tension at an angle of approximately 54 degrees around the mandrel in one directions and then in an opposite direction, as this wind angle is known to produce a pipe having an optimum degree of both hoop and longitudinal strength. The number of fiber windings that are used to construct the structural pipe wall depends on the particular size of and application for the pipe. While the above-described technique has been directed toward the construction of pipe, it is to be understood that the same technique can be used to construct pipe fittings such as tees, elbows and the like as well.

The reinforcing fiber component may be selected from conventional filament materials used for forming FRP pipe that do not melt when exposed to fire such as glass, carbon, and the like, and combinations thereof. In a preferred embodiment, the reinforcing fiber is glass. The structural pipe wall is constructed so that a sufficient amount of the resin component is used to wet and bond together the fiber windings. The structural pipe wall may comprise in the range of from about 10 to 40 percent by weight of the resin component. In a preferred embodiment, the structural pipe wall comprises approximately 25 percent by weight resin. The resin is applied to the fiber windings by a conventional application technique, such as by running the windings through a resin bath.

The resin component may be selected from the group of resins consisting of phenolic resins, siloxane-modified phenolic resins, furan resins, and mixtures thereof. Any type of phenolic resin can be used as the resin component and is ultimately selected based on the desired physical properties for the intended end use application. Preferred phenolic resins suitable for use in forming the structural pipe wall include phenolic resole and phenolic novolac resins. Suitable phenolic resins can include those based on phenol, substituted phenols like para-cresol, xylenol, bisphenol A, paraphenylphenol, paratert-butyl phenol, para-t-octyl phenol and resorcinol. The phenolic resin can be prepared by combining a suitable phenol with an aldehyde, such as formaldehyde, acetaldehyde, paraldehyde, glyoxal, hexamethylenetetraamine, and furfural.

Preferred phenolic resins are low viscosity phenolic resole resins because of their optimal wetting of the fiber-reinforcing material and their contribution to producing a fiber-reinforced pipe having a high glass content. Preferred phenolic novolacs found most useful in this invention are prepared from any of the phenols and aldehydes previously described and have molecular weights in the range of from about 400 to 5,000 with glass transition temperatures in the range of from about 40° C. to 90° C. Phenolic resoles found most useful in this invention have molecular weights in the range of from about 300 to 3,000, solids contents from 50 to 90% by weight, and may contain from 2 to 20% by weight free phenol or substituted phenol and from 1 to 10% by weight water.

Manufacturers of suitable phenolic resins include: B.P. Chemical Division of British Petroleum of Barry U.K.; the Packaging and Industrial Products Division of Borden, Inc., of Columbus, Ohio; the Durez Division of Occidental Petroleum of Dallas, Tex.; Georgia-Pacific Corporation of Atlanta, Ga.; Neste Resins Corporation of Eugene, Oreg., as well as a number of other small producers. Some preferred phenolic resins include B.P. Chemical's Cellobond J1996L, J2018L and J2027L, Borden's SL-898 phenolic resole, and Georgia-Pacific's GP5018 phenolic resole.

Particularly preferred siloxane-modified phenolic resins useful in forming the structural pipe wall include those prepared by combining, in a first embodiment, a silicone intermediate, a phenol or substituted phenol, and an aldehyde donor, by combining in a second embodiment, one of the above-described phenolic novolac resins with a silicone intermediate, or by combining, in a third embodiment one of the above-described phenolic resole resins with a silicone intermediate.

In a first embodiment, a siloxane-modified phenolic resin is prepared by combining phenol or a substituted phenol described above, with an aldehyde described above, and a silicone intermediate. The amount of aldehyde present and the type of catalyst used will determine whether a siloxane-modified phenolic novolac or resole resin is formed.

With respect to the silicone intermediate, alkoxy-functional and silanol-functional silicone intermediates may be used. Silicone intermediates as referred to in this invention are chemical polymer structures that have an —Si—O— backbone and that are capable of undergoing further reaction, e.g., hydrolysis and/or condensation, to form a cured polymer structure. A preferred class of silicone intermediates have the formula

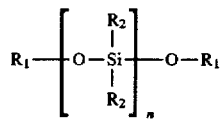

where each $R_2$ is independently selected from the group consisting of the hydroxy group, alkyl, aryl, aryloxy, and alkoxy groups having up to six carbon atoms, where each $R_1$ is independently selected from the group consisting of hydrogen, alkyl, and aryl groups having up to 12 carbon atoms, and where n is an integer in the range of from 1 to 56, selected so that the average molecular weight of the silicone intermediate is from about 150 to about 10,000. It is believed that the molecular weight of the silicone intermediate selected may have an impact on the degree to which an interpenetrating polymer network (IPN) of phenolic polymer and siloxane polymer is formed, and the proportion of siloxane groups that copolymerize with the phenolic polymer to form a continuous phase.

Another group of silicone intermediate can be represented by an hydroxyl (OH) containing silicone material, including those materials wherein the OH group or groups are attached directly to the silicon atom such as the silanol materials having the general formulas

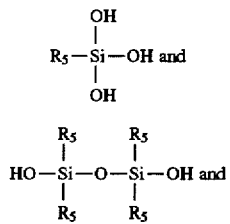

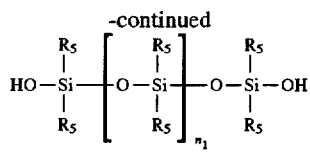

where each $R_5$ group may comprise a hydrocarbon radical selected from the group including alkyl, alkenyl, cycloalkyl, aryl, alkaryl, or aralkyl radicals, and where $n_1$ may be an integer in the range of from about one to thirty.

Still another group of OH containing silicone materials are materials that comprise two or more OH groups attached to a silicon atom, and that have two or more silicon atoms attached through divalent organic radicals, such as those having the general formula

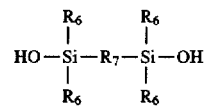

where each $R_6$ group may comprise another OH group or may comprise a hydrocarbon radical selected from the group including alkyl, cycloalkyl, aryl, alkaryl, and alkylaryl radicals, where $R_7$ may comprise a divalent organic radical selected from the group including methylene, polymethylene, aralyene, polyaralyne, cycloalkylene, and polycycloalkylene.

Methoxy-functional silicone intermediates useful in this invention include, but are not limited to: DC-3074, DC-3037 from Dow Corning Corporation of Midland, Mich.; SY-231 (molecular weight approximately 1,000) and MSE-100 from Wacker Silicone Corporation; and SR-191 from General Electric. Silanol-functional silicone intermediates generally have in the range of from about 0.5% to 6% by weight Si—OH. Commercially available silanol-functional silicone intermediates useful in this invention include, but are not limited to: Diphenylsilandiol (molecular weight approximately 216), Wacker Silicones SY-409 (molecular weight approximately 10,000) and SY-430; and the following materials from Dow Corning: DC804, DC805, DC806A, DC840, Z-6018, DC-1-2530, DC-6-2230, DC-1-0409, DC-1-0410 and laminating resins 2103, 2104 and 2106.

A preferred first embodiment of a siloxane-modified phenolic resin is prepared by combining phenol, or substituted phenol, an aldehyde such as formaldehyde, and a silicone intermediate. On the basis of a charge weight of one mole of phenol, the weight of formaldehyde will vary between 0.75 and 0.90 moles, and the weight of silicone intermediate will vary between 0.01 and 0.3 moles. The molar ratio of phenol to formaldehyde in a phenolic novolac resin is typically 1:0.75–0.90. Table 1 shows the typical molar ranges of silicone intermediates, having different molecular weights, used to prepare the siloxane-modified phenolic novolac resin.

TABLE 1

| SILICONE INTERMEDIATE | MOLECULAR WEIGHT | 1 MOLE PHENOL AND 0.75 MOLE FORMALDEHYDE | 1 MOLE PHENOL AND 0.90 MOLE FORMALDEHYDE |
| --- | --- | --- | --- |
| Diphenylsilandiol | 216 | 0.01–0.3 mole silicone intermediate | 0.01–0.3 mole silicone intermediate |
| SY-231 | 1,000 | 0.01–0.2 mole silicone intermediate | 0.01–0.2 mole silicone intermediate |
| SY-409 | 10,000 | 0.01–0.05 mole silicone intermediate | 0.01–0.05 mole silicone intermediate |

A first preferred embodiment of a siloxane-modified phenolic resole resin is prepared by combining phenol, or substituted phenol, an aldehyde such as formaldehyde, and a silicone intermediate. On the basis of a charge weight of one mole of phenol, the weight of formaldehyde will vary between 1.2 and 3 moles, and the weight of silicone intermediate will vary between 0.01 and 0.7 moles. The molar ratio of phenol to formaldehyde in a phenolic resole resin is typically 1:1.2–3. Table 2 shows the typical ranges of silicone intermediates having different molecular weights used to prepare the siloxane-modified phenolic resole resin.

TABLE 2

| SILICONE INTERMEDIATE | MOLECULAR WEIGHT | 1 MOLE PHENOL 1.2 MOLE FORMALDEHYDE | 1 MOLE PHENOL 3 MOLE FORMALDEHYDE |
| --- | --- | --- | --- |
| Diphenylsilandiol | 216 | 0.01–0.7 mole silicone intermediate | 0.01–0.3 mole silicone intermediate |
| SY-231 | 1,000 | 0.01–0.02 mole silicone intermediate | 0.01–0.02 mole silicone intermediate |
| SY-409 | 10,000 | 0.01–0.05 mole silicone intermediate | 0.01–0.05 mole silicone intermediate |

For each of the above-described first embodiments of the siloxane-modified phenolic novolac and resole resins, it is desired that in the range of from about 0.5 to 35 percent by weight of the silicone intermediate be used.

In preparing first embodiments of the siloxane-modified phenolic resins, catalysts are used to form either a desired phenolic novolac or phenolic resole resin prepolymer. For example, when forming the siloxane-modified phenolic resin, a strong acid such as sulfuric acid, sulfonic acid, oxalic acid, or phosphoric acid is used to facilitate formation of the phenolic novolac resin prepolymer. When forming the siloxane-modified phenolic resin, a strong base such as sodium hydroxide, calcium hydroxide or barium hydroxide is used to facilitate formation of the phenolic resole prepolymer. In preferred first embodiments, a siloxane-modified phenolic novolac resin may be prepared by using up to about five percent by weight acid catalyst, and a siloxane-modified phenolic resole resin may be prepared by using up about five percent by weight base catalyst.

Catalysts other than, and in addition to, those described above can optionally be used in preparing first embodiments of the siloxane-modified phenolic resin to facilitate condensation of the phenolic resin and silicone intermediate by reducing the time and/or temperature associated with such reactions. Catalysts useful for facilitating condensation of the phenolic resin and silicone intermediate are the same, and can be used in the same proportion, as those described below that can optionally be used for preparing second and third embodiments of the siloxane-modified phenolic resin.

First embodiments of the siloxane-modified phenolic novolac and resole resins are prepared by first combining the phenol and silicone intermediate ingredients and then adding the aldehyde ingredient to form a mixture of phenolic polymers, siloxane polymers, and phenolic-siloxane polymers. Elevating the temperature of the combined mixture is desirable to reduce reaction times associated with forming the siloxane-modified phenolic resin.

For example, a first embodiment of the siloxane-modified phenolic novolac resin can be prepared by a batch process using a jacketed stainless-steel reaction vessel equipped with a turbine blade or anchor-type agitator, a vapor condenser, and a temperature controller. Typically, molten phenol is charged to the reaction vessel, the agitator is started and silicone intermediate is added. An acid catalyst can be added at this point to facilitate formation of the phenolic novolac polymer. Formalin (37–40 percent aqueous formaldehyde) is then charged to the reaction vessel, either before raising the temperature, or by controlled addition at elevated temperature. A vigorous condensation reaction ensues which is highly exothermic. The condensation step is continued until the desired molecular weight distribution has been achieved. During this time the mixture may become two phases with separation of the resinous component. The actual reaction time will vary depending on the desired molecular weight distribution, the use of one or more catalysts, pH, and aldehyde to phenol to silicone intermediate mole ratios.

The ingredients are mixed together, during which time the phenol, aldehyde and silicone intermediate undergo polycondensation, which polycondensation can optionally be accelerated by action of a catalyst, as described below. During this time, alkoxy-functional silicone intermediates also undergo hydrolysis to form silanol-functional silicone intermediates, which polymerize to form a siloxane polymer and also copolymerize with the newly-formed phenolic novolac resin prepolymer to form a siloxane-modified phenolic resin. Accordingly, the resulting resin comprises an IPN of phenolic novolac polymer and siloxane polymer, and a continuous phase formed from the phenolic polymer having one or more siloxane groups in its backbone.

Hydrolysis of the alkoxy-functional silicone intermediates can optionally be accelerated by action of a catalyst, as described below. Alternatively, silanol-functional silicone intermediates can be used in the process which can copolymerize directly with newly-formed phenolic novolac resin prepolymer.

At the end of the condensation period, water, residual moisture, unreacted phenol and low molecular weight species may be removed by atmospheric, vacuum or steam distillation. The point at which distillation is stopped is usually determined by taking a sample of the resin and measuring its melt viscosity. After the resin has cooled, it can be treated in several ways. It can be sold in lump or flake form, compounded to form molding powders, or it can be ground and blended with hexamine and other fillers.

As another example, a first embodiment of the siloxane-modified phenolic resole resin can be prepared by a batch process using the same equipment previously described for preparing a first embodiment of the siloxane-modified phenolic novolac resin. Typically, molten phenol is charged to the reaction vessel, the agitator is started and silicone intermediate is added. Alkaline catalysts may be added at this time to facilitate formation of the phenolic resole polymer. Formalin is added and the batch is heated. The initial reaction is exothermic. Condensation is usually carried out at atmospheric pressure and at temperatures in the range of from 60° to 100° C. or at reflux. Because siloxane-modified phenolic resole siloxane resins are themselves thermosetting, dehydration is carried out quickly and at low temperatures so as to prevent over-reaction or gelation. The end point is found by manual determination of a specific hot-plate gel time, which decreases as resinification advances. Siloxane-modified phenolic resole resins can be refrigerated to prolong their storage stability.

Second and third embodiments of a siloxane-modified phenolic novolac resin and a siloxane-modified phenolic resole resin, respectively, are prepared by using a phenolic novolac resin and phenolic resole resin, respectively, as starting materials. Suitable phenolic resole and phenolic novolac resins include those previously described above. The second embodiment of the siloxane-modified phenolic novolac resin is prepared by combining in the range of from 75 to 95 percent by weight of the phenolic novolac resin. The third embodiment of the siloxane-modified phenolic resole resin is prepared by combining in the range of from 65 to 99.5 percent by weight of the phenolic resole resin.

With respect to the silicone intermediate, those silicone intermediates previously described for preparing the first embodiments of the siloxane-modified phenolic resin are also used to prepare the second and third embodiments of the siloxane-modified phenolic resins. Second and third embodiments of the siloxane-modified phenolic resins may each comprise in the range of from 0.5 to 35 percent by weight of the alkoxy-functional or silanol-functional silicone intermediate.

In the second embodiment, the siloxane-modified phenolic novolac resin is prepared by combining a phenolic novolac resin with a formaldehyde donor and a silicone intermediate. Suitable formaldehyde donors include aqueous formaldehyde solutions, paraform, trioxane, hexamethylenetetramine and the like, a preferred material is hexamethylenetetramine. The second embodiment of the siloxane-modified phenolic novolac resin may comprise in the range of from about 3 to 15 percent by weight of the formaldehyde donor.

The third embodiment of a siloxane-modified phenolic resole resin is prepared by combining a phenolic resole resin with a silicone intermediate. If desired, either an acid or base catalyst can optionally be used to reduce reaction time associated with finally curing the resin. Suitable inorganic acid catalysts that can optionally be used in the third embodiment include phosphoric, hydrochloric, and sulfuric acids. Suitable organic acids that can optionally be used in the third embodiment include paratoluene sulfonic and phenyl sulfonic acids. Latent acid catalysts can also be used in to improve pot life and to increase the application window without gel formation. Suitable base catalysts for curing phenolic resoles include various forms of barium and magnesium oxide, and the like. Commercially available proprietary latent acid type catalysts useful in this invention are available from British Petroleum Chemicals under the trade name Phencat 381 and Phencat 382. Other proprietary catalysts include Borden RC-901, a diphenyl phosphoric acid ester supplied from Dover Corp., having the product name Doverphos 231L, and Georgia-Pacific's GP3839 and GP308D50. The third embodiment of the siloxane-modified phenolic resole resin may comprise up to about 15 percent by weight of the optional acid or base catalyst or curing agent.

If desired, the first, second and third embodiments of the siloxane-modified phenolic resins may each optionally comprise a sufficient amount of catalyst to reduce the reaction time and reduce the reaction temperatures associated with condensing the silicone intermediate and copolymerizing it with the phenolic polymer during formation of the siloxane-modified phenolic resin.

Suitable catalysts are selected from the group consisting of organometallic compounds, amine compounds, and mixtures thereof. Combinations of an organometallic compound with an amine compound are preferred, when desired, for catalyzing hydrolysis and/or condensation of the silicone intermediate. Useful organometallic compounds include metal driers well known in the paint industry such as zinc, manganese, cobalt, iron, lead and tin octoate, neodecanates and naphthenates, and the like. Organotitanates such as butyl titanate and the like are also useful in the current invention.

A preferred class of organometallic compounds useful as a catalyst is organotin compounds which have the general formula

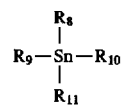

where $R_8$, $R_9$, $R_{10}$ and $R_{11}$ are selected from the group consisting of alkyl, aryl, aryloxy, and alkoxy groups having up to 11 carbon atoms, and where any two of $R_8$, $R_9$, $R_{10}$ and $R_{11}$ are additionally selected from a group consisting of inorganic atoms consisting of halogen, sulfur and oxygen.

Organotin compounds useful as catalysts include tetramethyltin, tetrabutyltin, tetraoctyltin, tributyltin chloride, tributyltinmethacrylate, dibutyltin dichloride, dibutyltin oxide, dibutyltin sulfide, dibutyltin acetate, dibutyltin dilaurate, dibutyltin maleate polymer, dibutyltin dilaurylmercaptide, tin octoate, dibutyltin bis (isooctylthioglycolate), butyltin trichloride, butylstannoic acid, dioctyltin dichloride, dioctyltin oxide, dioctyltin dilaurate, dioctyltin oxide, dioctyltin dilaurate, dioctyltin maleate polymer, dioctyltin bis (isooctylthioglycolate), dioctyltin sulfide, and dibutyltin 3-mercapto propionate. The first, second and third embodiments of the siloxane-modified phenolic resin may comprise up to about five percent by weight of the organometallic catalyst.

With respect to the amine compound, preferred amine compounds for optionally catalyzing the hydrolysis and/or condensation reactions of the silicone intermediate have the general formula

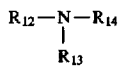

where $R_{12}$ and $R_{13}$ are each selected from the group consisting of hydrogen, aryl, and alkyl groups having up to 12 carbon atoms, and where $R_{14}$ is selected from the group consisting of alkyl, aryl, and hydroxyalkyl groups having up to 12 carbon atoms.

Suitable amine compounds useful as catalysts include dimethyl methanolamine, ethylamino ethanol, dimethyl ethanolamine, dimethyl propanolamine, dimethyl butanolamine, dimethyl pentanolamine, dimethyl hexanolamine, methylethyl methanolamine, methylpropyl methanolamine, methylethyl ethanolamine, methylethyl propanolamine, monoisopropanolamine, methyldiethanolamine, triethanolamine, diethanolamine, and ethanolamine. Preferred amine compounds include dimethyl ethanolamine and ethyl aminoethanol. The first, second and third embodiments of the siloxane-modified phenolic resin may comprise up to about five percent by weight of the amine catalyst.

If desired, the organometallic compound and amine compound can each be used independently to form a siloxane-modified phenolic resin. However, it has been discovered that when combined, the organometallic compound and amine compound act synergistically to catalyze the curing process, thereby reducing the curing time further and/or reaction temperatures greater than that observed by using either the organometallic or amine catalyst alone. Accordingly, if desired under the circumstances, it is preferred that an organometallic compound be used in combination with an amine compound to catalyze both the formation of hydroxide by hydrolysis of the silicone intermediate, in the event that an alkoxy-functional silicone intermediate is used, and polymerization by condensation of both the alkoxy and silanol-functional silicone intermediate. An exemplary organometallic and amine compound combination is dibutyltin diacetate and ethyl aminoethanol. Dibutyltin diacetate, when combined with the amine, reacts synergistically to catalyze the curing process. Although it is believed that the synergistic effect of the organotin compound and the amine compound is mechanistic in character, the exact mechanism is not known.

A preferred ratio of organometallic compound to amine compound, when used together as the catalyst, is approximately one to one. Therefore, the first, second and third siloxane-modified phenolic resins may comprise up to about 10 percent by weight combined organometallic and amine catalyst. Accordingly, siloxane-modified phenolic resins prepared by combining an organometallic and amine catalyst, and an optional acid or base catalyst may comprise up to about 25 percent by weight catalyst. Preferred first, second and third siloxane-modified phenolic resins comprise in the range of from 5 to 25 percent by weight of the combined catalysts.

Water may be present in the form of an aqueous phenolic resole or in the form of an aqueous formaldehyde. For example, the phenolic resole may comprise in the range of from 3 to 12 percent by weight water, and the formaldehyde may comprise formalin, which is approximately 37–40 percent aqueous formaldehyde. The first, second and third embodiments of the siloxane-modified phenolic resin can result in the formation of phenolic resins having very low or zero water content, which provides improved fire stability and processing characteristics. The silicone intermediate functions as a reactive diluent to give a stable product with generally low viscosity.

Second and third embodiments of the siloxane-modified phenolic resin are prepared by combining in the above-described proportions a phenolic novolac or resole resin with a methoxy or silanol-functional silicone intermediate. A formaldehyde donor is added in the second embodiment. If desired, the catalyst for the phenolic resin, and the catalyst for the silicone intermediate, i.e., the organometallic compound and/or the amine compound, can optionally be added to reduce reaction and cure time and reduce reaction temperature.

Fire resistant pipes having the structural pipe wall and fiber-reinforced resin layer(s) formed from siloxane-modified phenolic resins display improved physical properties of hoop strength, chemical resistance, flexibility, impact resistance, and flexural modulus when compared to pipes otherwise formed from non-modified phenolic resins, without affecting the physical properties of heat, flame and chemical resistance inherent in the phenolic resin. Additionally, fire resistant pipes formed from such siloxane-modified phenolic resins have reduced microvoid formation and, therefore, densities closer to theoretical density when compared to conventional non-modified phenolic resins. Less microvoid formation also prevents possible water entrapment that would adversely affect the resin's temperature resistant properties due to steam generation and related resin matrix failure.

Furan resins can be selected for use in forming the structural pipe wall because of their enhanced temperature resistance when compared with conventional epoxy and polyester FRP resins. Furan resins, however, display a lower degree of temperature resistance and are more expensive than either the phenolic or siloxane-modified phenolic resins.

The structural pipe wall of the fire resistant pipe is constructed having one or more layers of fiber windings. For example, for an approximately two inch (51 millimeters) inside diameter pipe, rated at 225 psig for fire fighting pipe service, it is desired that the structural wall comprise in the range of from 2 to 20 layers of fiber winding, and optimally 6 to 16 layers of fiber winding. A structural pipe wall having less than about 2 layers of fiber winding will have a degree of hoop and longitudinal strength, and temperature resistance less than that desired for use in a fire fighting pipe application. A structural pipe wall constructed having more than about 20 layers of fiber winding is more than that necessary to provide a sufficient degree of hoop and longitudinal strength, and temperature resistance for use in a fire fighting pipe application and, therefore adds unnecessary weight and expense to the pipe.

Referring again to FIG. 1, a fire resistant pipe constructed according to principles of this invention includes a release layer 16 disposed onto an outside surface of the structural pipe wall 12, and a fiber-reinforced resin layer 18 disposed onto a surface of the release layer 16. In an exemplary embodiment, the fire resistant pipe comprises a jacket 20 of alternating release layers 16 and fiber-reinforced resin layers 18 disposed around the outside surface of the structural pipe wall 12.

Materials useful for forming the release layer 16 is preferably one that does neither bonds with the resin used to form the adjacent structural pipe wall or the resin used to form the fiber-reinforced resin layer. It is desired that the release layer not form a bond with an adjacent structural pipe wall or fiber-reinforced resin wall to permit the release layer to act as a disbandment layer between the resin-containing layers. The disbanding action of the release layer serves to improve the impact of the fire resistant pipe by attenuating the travel of any shock waves through the pipe caused by impacts to the outside surface. Functioning in this manner, the release layers act to deaden or prevent potentially damaging impact shock waves from traveling completely through the pipe to the structural wall, thereby preventing possible fracture or rupture.

Suitable materials for forming the release layer include films formed from polymeric materials that are chemically incompatible with the particular resin used to form the structural pipe wall and fiber-reinforced resin layer(s). Examples of such polymeric materials include polyolefins such as polypropylene, polyethylene and the like. A particularly preferred release layer is formed from polypropylene.

It is also desired that the material selected to form the release layer be capable of absorbing heat energy applied from the pipe surface, and preferably be a material capable of absorbing a large degree of heat from an outside surrounding layer and using such energy, e.g., via an endothermic reaction, to effect a phase change, e.g., from solid to gas, below the degradation temperature of the structural wall. The gas formed from the release layer(s) acts to form a thermally insulating air gap between the adjacent fiber-reinforced resin layer, and between the fiber reinforcing layers and the structural pipe wall. The air gap allows each of the independent fiber-reinforced resin layers to act as a radiation shield to increase the thermal resistance of the pipe by requiring that radiant heat be progressively transferred through each fiber-reinforced resin layer before reaching the structural pipe wall. The multi-radiation shield function of the air gaps avoids the potentially high wall stresses in the pipe caused by the steep thermal gradient on the outside of the pipe during a fire.

The materials noted above for forming the release layer are also heat absorbing and, therefore, useful in forming a release layer that is both disbanding and energy absorbing. Other suitable release layer materials include solid hydrate or hydrite materials and the like that are capable of undergoing an endothermic phase transformation to vaporize, or liberate a gas, at a temperature below the degradation temperature of the resin selected to form the underlying structural wall, i.e., below about 300° C. Examples of preferred energy absorbing materials include polypropylene, polyethylene, hydrated calcium sulfate (gypsum), aluminum trihydroxide, and other hydrated or hydroxide containing compounds capable of vaporizing or producing a gas constituent below about 300° C.

Polymeric materials, such as polypropylene, polyethylene and the like, filled with a powder component are also desired, as the combination of gas and powder produced during vaporization produces a gas and powder layer between the outside surrounding layer and the structural pipe wall having enhanced thermal insulating properties.

The number of alternating release and fiber-reinforced resin layers used to form the jacket that surrounds the structural pipe wall depends on the particular fire pipe application and the degree of heat or flame resistance desired. In an exemplary embodiment, for a pipe having a structural pipe wall diameter of approximately two inches (51 millimeters), a minimum jacket thickness is approximately ⅛ inches (3 millimeters), comprising four each alternating release and fiber-reinforced resin layers, as shown in FIG. 1. In forming pipe fittings, such as elbows, Y-connections, T-connections and the like, a minimum jacket thickness of approximately ⅛ inches (3 millimeters), as desired. It is to be understood that the exact number of release and fiber-reinforced resin layers that are used to make up a jacket of any designated thickness depends on the thickness of both the release layer material and the fiber-reinforcing material.

When the release layer of the jacket is polypropylene tape, it is applied to the structural pipe wall by the same winding technique described above for the structural pipe wall. Where the release layer is other than polypropylene or other material in tape form, it can be applied in sheet form, in spray form, or in the form of solid half sheets configured to fit over part of the structural pipe wall.

Each fiber-reinforced resin layer is wound around an outside surface of a respective release layer. The material use to form the fiber-reinforced resin can be the same as that selected to form the structural pipe wall, or can be different. In a preferred embodiment, the fiber-reinforced resin is the same and is applied in the same manner as that selected to form the structural pipe wall. Like the release layer, the number of fiber-reinforced resin layer that are applied depends on the particular fire pipe application and the degree of heat or flame resistance desired.

The jacket surrounding the structural pipe wall may comprise repeating release layers that are each formed from the same or different materials. For example, a fire resistant pipe may have a jacket comprising release layers the are formed from progressively more energy absorbing materials moving from the structural pipe wall to the outermost fiber-reinforced resin layer, to thereby provide a graduated degree of heat protection with the highest protection located where it is needed most, i.e., nearest the outermost surface of the pipe. In such an embodiment, the material selected to form an outermost release layer would have a relatively higher vaporization temperature than the remaining release layer that would be below the degradation temperature of the adjacent fiber-reinforced resin layers.

Additionally, the jacket surrounding the structural pipe wall may comprise an outermost fiber-reinforced resin layer having, as a filament component, at least one carbon fiber winding for purposes of holding the jacket together during pipe exposure to fire temperatures that exceed the melting temperature of glass filament.

Although the construction of fire resistant pipe embodiments have been specifically described and illustrated above, it is to be understood that this invention also includes the construction of fire resistant pipe fittings. Referring to FIGS. 2A to 2C, fire resistant pipe fittings, such as elbows 22, tees 24, Y-shaped fittings 26, and the like are also prepared according to principles of this invention.

Fire resistant pipes and pipe fittings of this invention can be used alone or combined to form a pipe assembly well suited for use in fire fighting pipe applications, such as fire fighting pipe assemblies that are used on offshore platforms and the like. Pipes and pipe fittings used in such applications must be able to function under conditions of high temperature and close flame vicinity without suffering significant reductions in hoop strength and longitudinal strength.

A key feature of fire resistant pipes constructed according to principles of this invention, is addition to the functions of the jacket release layer serving to enhance the impact resistance of the pipe and reduce thermally generated stress, is that such construction, unlike intumescent or ablative coatings, eliminates arisen of the protective jacket by direct impingement of a high velocity fire, i.e., a jet fire. The fire pipe construction of this invention does not consume itself in a fire and, thus is capable of lasting longer and being available for protection throughout the duration of a fire.

The following examples are provided below for purposes of better understanding fire resistant pipes constructed according to principles of this invention.

EXAMPLE NO. 1

A two inch (51 millimeter) diameter fiber-reinforced structural pipe wall was constructed comprising approximately twelve layers of a fiber-reinforced resin. The fiber reinforced resin was made from fiberglass reinforcing fiber windings bonded together with a siloxane-modified phenolic resin. The siloxane-modified phenolic resin was prepared by combining a major proportion of phenolic resole resin with approximately 15 percent by weight silicone intermediate.

The impact resistance of the structural pipe wall was tested by dropping a 60 mm steel ball, weighing 0.9 kg from progressive heights to impact the pipe perpendicularly. After the impacts were completed the pipe was pressurized with air at a pressure of 25 psig and held under water for detection of visible air leaks. Under these test conditions the unjacketed structural pipe wall displayed a 75 percent probability of failure, i.e., three of the four impacts leaked air, after four drops from a ball drop height of approximately 10 inches (25 centimeters). The same unjacketed structural pipe wall displayed complete or a 100 percent probability of failure, i.e., each of the four impacts leaked air, after four drops when the ball drop height was further increased to 12 inches (30 centimeters).

EXAMPLE NO. 2

A two inch diameter structural pipe wall was constructed according to Example No. 1, and a jacket was disposed around the structural pipe wall to form a fire resistant pipe. The jacket was formed from approximately four each repeating layers of polypropylene tape and fiber-reinforced resin. The fiber-reinforced resin layers were formed from the same materials used to form the structural pipe wall.

The impact resistance of the fire resistant pipe so formed was tested according to the above-described method. The fire resistant pipe did not display any signs of air leakage, i.e., zero percent probability of failure, until a ball drop height of approximately 35 inches (100 centimeters) was reached. At 35 inches, only one impact out of eight showed any signs of leakage. At drop heights of 40 and 54 inches, only three impacts out of eight and Therefore, a fifty percent probability of failure for the jacketed pipe was observed to occur at approximately 45 inches, compared to 10 or 11 inches with the unjacketed structural pipe wall. Accordingly, based on such test data, the jacketed pipe displayed a 400 percent improvement in impact resistance when compared to a unjacketed pipe.

Although specific embodiments and examples of fire resistant pipes and pipe fittings have been described and illustrated, many modifications and variations will be apparent to those skilled in the art. It is, therefore, to be understood that, within the scope of the appended claims, fire resistant pipe and pipe fittings of this invention can be constructed other than as specifically described herein.

What is claimed is:

1. A fire resistant pipe comprising:
   a structural wall comprising layers of helically wound reinforcing fiber bonded with a resin selected from the group consisting of phenolic resins, siloxane-modified phenolic resins, furan resins, and mixtures thereof; and
   a jacket disposed around the structural wall, the jacket comprising:
   at least one release layer of material that is chemically incompatible with the resin used to form the structural wall; and
   at least one fiber-reinforced resin layer disposed around a surface of the release layer.

2. The fire resistant pipe as recited in claim 1 wherein the jacket comprises a number of alternating release and fiber-reinforced resin layers.

3. The fire resistant pipe as recited in claim 1 wherein the fiber-reinforced resin layer comprises helically wound reinforcing fibers bonded with a resin selected from the group consisting of phenolic resins, siloxane-modified phenolic resins, furan resins, and mixtures thereof.

4. The fire resistant pipe as recited in claim 1 wherein the release layer is formed from a polyolefinic material.

5. The fire resistant pipe as recited in claim 4 wherein the release layer is formed from material adapted to absorb heat energy by undergoing a phase change.

6. The fire resistant pipe as recited in claim 1 wherein the fiber component used to form the structural wall is selected from the group consisting of glass, carbon, and combinations thereof.

7. A fire resistant pipe as recited in claim 1 wherein the resin used to form the structural wall and the fire resistant layer are both siloxane-modified phenolic resins.

8. A fire resistant pipe comprising:
   a structural wall comprising layers of helically wound reinforcing fiber bonded with a resin selected from the group consisting of phenolic resins, siloxane-modified phenolic resins, furan resins, and mixtures thereof;
   a jacket disposed around the structural wall, wherein the jacket comprises a number of alternating release layers and fiber-reinforced resin layers, wherein a fiber-reinforced resin layer forms an outermost pipe layer, and wherein the release layers are formed from a material that in incapable of forming a bond with the resin component of the structural wall and the fiber-reinforced layers.

9. The fire resistant pipe as recited in claim 8 wherein material used to form the release layer is selected from the group consisting of materials capable of absorbing energy by phase transformation at a temperature below a degradation temperature of the structural wall.

10. The fire resistant pipe as recited in claim 8 wherein the fiber-reinforced resin layer comprises layers of helically wound reinforcing fiber bonded with a resin selected from the group consisting of phenolic resins, siloxane-modified phenolic resins, furan resins, and mixtures thereof.

11. The fire resistant pipe as recited in claim 8 wherein the energy absorbing material layer is formed from a polyolefinic material.

12. The fire resistant pipe as recited in claim 8 wherein the resin selected to form the structural wall is the same as a resin selected to form the fiber-reinforced resin layers.

13. A fire resistant pipe comprising:
   a structural wall comprising layers of helically wound reinforcing fiber bonded with a resin selected from the group consisting of phenolic resins, siloxane-modified phenolic resins, furan resins, and mixtures thereof; and
   a jacket disposed around the structural wall, the jacket comprising:
   at least one release layer of material that is chemically incompatible with the resin used to form the structural wall; and
   at least one fiber-reinforced resin layer disposed around a surface of the release layer, wherein the fiber-reinforced resin layer comprises helically wound reinforcing fiber bonded with a resin selected from the group consisting of phenolic resins, siloxane-modified phenolic resins, furan resins, and mixtures thereof, and wherein the release layer is formed from a material that is chemically incompatible with the resin used to form the fiber-reinforced resin layer.

14. The pipe as recited in claim 13 wherein the release material is formed from a material that is further adapted to absorb heat energy by undergoing a phase change.

15. The pipe as recited in claim 14 wherein the release layer is formed from a polyolefinic material.

16. The pipe as recited in claim 13 wherein the resins used to form the structural pipe wall and the fiber-reinforced resin layer are the same.

17. A fire resistant pipe comprising:

a structural wall comprising layers of helically wound reinforcing fiber bonded with a resin selected from the group consisting of phenolic resins, siloxane-modified phenolic resins, furan resins, and mixtures thereof;

a jacket disposed around the structural wall, wherein the jacket comprises a number of alternating release layers and fiber-reinforced resin layers, wherein a release layer is disposed around an outside surface of the structural wall, wherein a fiber-reinforced resin layer forms an outermost pipe layer, wherein each fiber-reinforced resin layer comprises a reinforcing fiber bonded with the same resin used to form the structural wall, and wherein each release layer is formed from a material that in incapable of forming a bond with the resin component of the structural wall and the fiber-reinforced layers.

18. The pipe as recited in claim 17 wherein the material used to form the release layer is selected from the group consisting of materials capable of absorbing energy by phase transformation at a temperature below a degradation temperature of the structural wall.

19. The pipe as recited in claim 18 wherein the material used to form the release layer is a polyolefinic material.

* * * * *